Nov. 5, 1935.  H. P. GRAY  2,019,566
ICE CREAM DISHER
Filed Feb. 6, 1934
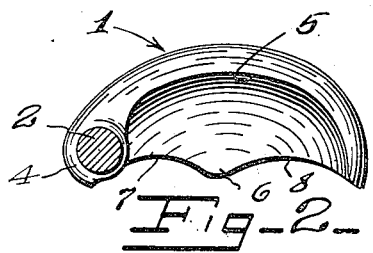
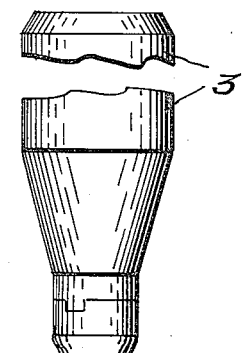
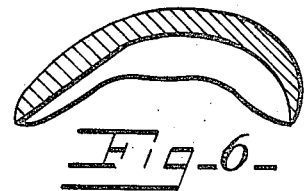
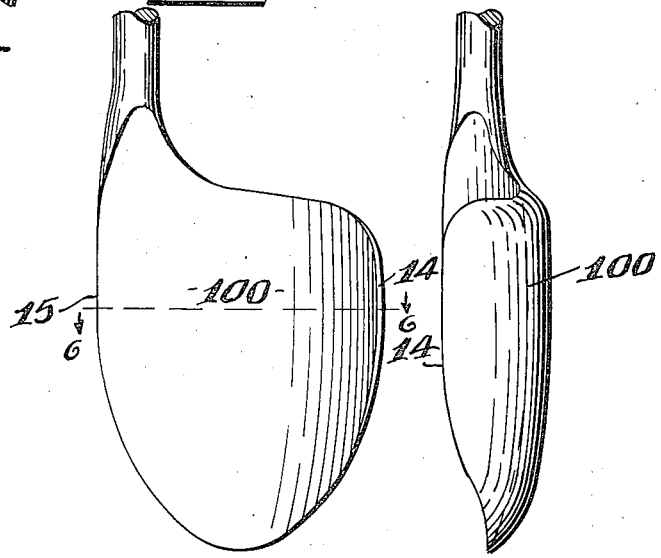
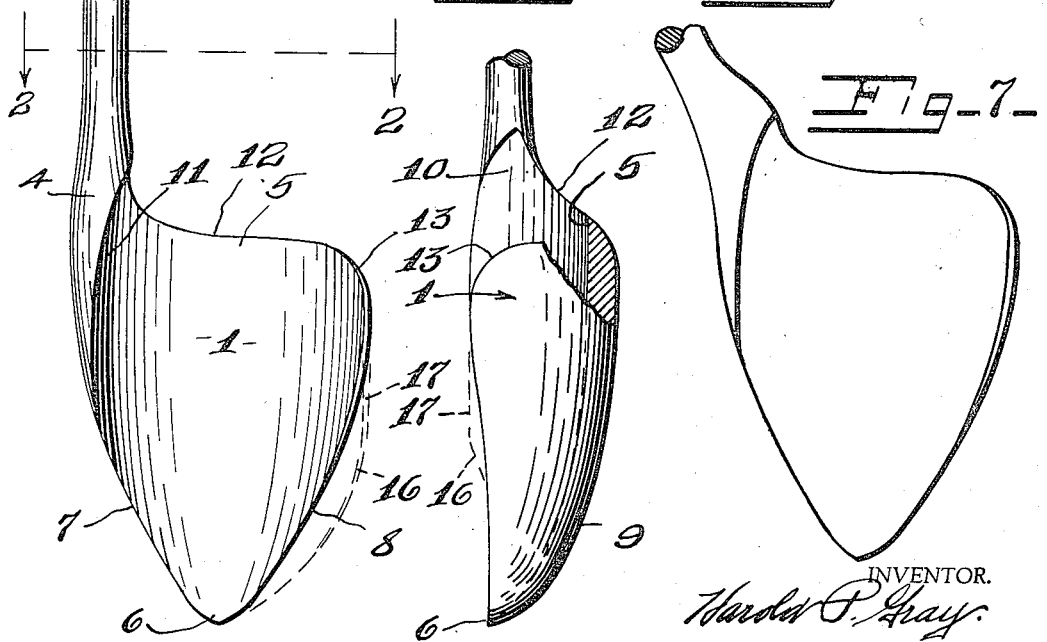
INVENTOR.
Harold P. Gray.
BY Bordell & Thompson
ATTORNEYS.

Patented Nov. 5, 1935

2,019,566

UNITED STATES PATENT OFFICE 2,019,566

ICE CREAM DISHER

Harold P. Gray, Leominster, Mass., assignor to T. N. Benedict Manufacturing Company, East Syracuse, N. Y., a corporation of New York Application February 6, 1934, Serial No. 709,983

1 Claim. (Cl. 107—48)

This invention relates to dishers used for dishing from a bulk container, semi-solid substances, as ice cream, and has for its object a tool, as a spoon, by which a measured quantity of the substance can be dished out in the form of a plug or cone and readily deposited in a dish or in a cone container, the spoon being such shape that after the cone or plug is cut by the spoon, the cone will remain in the spoon while the spoon is being withdrawn out of the body of the substance or ice cream and preferably without the use of anything other than the formation of the spoon to hold the cone in the spoon and will also readily release from the spoon, preferably without releasing means.

It further has for its object a spoon of this type having a transverse curved or concave spoon blade wherein the handle is so located relatively to the blade or offset from the central line of the blade that the spoon can be readily manipulated or turned to cut a plug or cone and also can be used as a spade to cut the cone by successive insertions and withdrawals in different arcs of the circumference of the cone or plug to be cut.

It further has for its object a spoon with such an offset handle with its larger rear end open and curved from one edge adjacent the shank of the handle downwardly when the tool is held in horizontal position and with the point located near the horizontal plane of the shank with the walls of the spoon tapering from the rear end toward the point.

Other objects will appear throughout the specification.

The invention consists in the details and correlation of details hereinafter described and claimed.

In describing this invention, reference is had to the accompanying drawing in which like characters designate corresponding parts in all the views.

Figure 1 is a plan view, partly broken away, of one embodiment of this spoon.

Figure 2 is a sectional view on line 2—2, Figure 1.

Figure 3 is a fragmentary side elevation of the spoon, the handle being broken away.

Figures 4 and 5 are views similar to Figures 1 and 3 of a slightly modified form of the invention, the handle being removed.

Figure 6 is a sectional view on line 6—6, Figure 4.

Figure 7 is a view similar to Figure 1 with the handle removed showing the handle shank as extending at an inclined angle to the lengthwise median line of the blade instead of parallel thereto as in Figure 1.

This disher for ice cream and substances having similar characteristics comprises a spoon or a spoon blade and handle having a shank portion adjacent the spoon extending parallel to the median line of the spoon and offset at one side thereof, the spoon being pointed at its advance and having its rear end open, and the spoon tapering from its rear open end toward the point, the latter being located near or in the horizontal plane of the portion of the shank joining the spoon when the spoon is held in horizontal position. Preferably, the shank portion joins the spoon at one lateral edge thereof and extends tangent thereto.

1 designates the spoon or the blade thereof connected to the shank 2 on which a handle 3 is mounted in any suitable manner. The shank 2 or at least the portion thereof adjacent the spoon or blade 1 extends parallel to the central lengthwise median line or plane of the spoon and is offset at one side of said line and is preferably tangent to one side of the spoon, as at 4.

In Figure 7, the handle shank 20 or the portion thereof adjoining the blade or spoon 21 is shown as off-set but instead of extending parallel to the lengthwise median line of the blade or spoon extends at an inclined angle thereto.

The spoon 1, as seen in Figure 2, is arcuate in end elevation or cross section and extends from one side edge of the arcuate formation downwardly below the horizontal plane of the shank 2 when the spoon is held in horizontal position, the central portion of the arc being in the deepest part of the spoon so that the side edges of the spoon, that is, the edges adjoining the handle and the opposite edge are in approximately the same plane. In Figure 2, the spoon is shown as inverted. Also, the spoon is open at its rear end at 5 and tapers toward the advance end terminating in a rounding point 6, which, as clearly seen in Figures 2 and 3, is approximately in the horizontal plane of the shank 2 when the article is held in horizontal position. The wall of the spoon tapers toward the point or the spoon becomes shallower from its deeper rear end toward the point. Hence, the side edges 7 and 8 of the spoon taper toward the point and also the bottom wall of the spoon tapers as shown at 9 in Figure 3 with portions of the curve above the middle of the spoon more nearly upright or inclined less out of the vertical than the portion approaching the point.

The inner surface 10 of the shank forms a continuation of the inner surface of the spoon 1 and a portion of the surface of the spoon 1 at 11 is also formed on the shank where the shank joins, or in effect runs alongside, the blade of the spoon. The intermediate part of the spoon blade is comparatively thick and the spoon is gradually bevelled off toward its edges 7 and 8, so that the front and rear edges are comparatively sharp and the sharpened edge lies in the surface of the inner face of the spoon. Also, the rear edge 12 of the spoon is curved as shown in Figure 1 slightly downwardly from the shank toward the edge of the spoon remote from the shank, and curves at 13, in an easy curve into the edge 8.

In the form shown in Figures 4 and 5, the spoon blade is less tapering than is shown in Figures 1 and 2 and is more in the form of a spade with the rear portions of its side edges formed as a straight edge at 14 and 15 so as to scrape close to the wall of the container and remove the ice cream from said wall when the spoon is used as a scraper. However, in order to provide a straight edge on the form of spoon shown in Figures 1 and 3, the edge remote from the shank 2 may be formed as indicated in dotted line at 16 to provide a straight scraping edge 17.

In operation, the spoon may be thrust vertically or nearly vertically into the body of ice cream in the container to the full depth of the blade and then the spoon rotated about its point by twisting force on the handle and the result is readily accomplished, due to the offset handle and its relation to the point and also to the shape of the blade, the arrangement of its surface and edges, particularly of the open rear end below the horizontal plane of the shank 2 or portion thereof adjoining the blade. After the spoon has been rotated so as to cut a conical plug, it is pulled out and at the same time a little prying action applied thereto so that the cone will remain in the spoon, from whence it can be deposited in a conical holder; or the spoon may be thrust vertically or nearly vertically into the body of the ice cream and withdrawn and then shifted into a diametrically opposite position and thrust into the body of the cream and either with or without a slight turning movement lifted out, bringing the cone therewith. Owing to the open rear end, the operator can readily see the cone he is cutting and guide the tool. Also, the open rear end facilitates the removal of the cone from the spoon.

In the form shown in Figures 4 and 5, the blade 100 is shaped to cut a plug that is less conical and more nearly cylindrical than that cut by the spoon shown in Figures 1 and 3.

In the form shown in Figures 4 and 5, the portion of the inner surface of the spoon on the handle side of the blade or spoon is of a different incline or curvature than the inner surface approaching the advance edge 101 of the spoon, when the same is being turned after being inserted in the body of ice cream.

As shown in Figure 6, the inner face of the spoon is formed flat or in the chord of an arc at 102 toward the side thereof adjacent the handle shank, although instead of being flat, it may be curved but of a different or less curvature than the portion of the surface approaching the advance cutting edge of the spoon, when it is being turned. The purpose of this flattened surface is to cause the cone or plug, when cut, to not fit exactly in the spoon, so that it will clear easily out of the spoon.

Also, the spoons are formed with an inner surface which is rough compared with the outer surface. This is for the purpose of causing the cone or plug to adhere somewhat in the spoon, when the spoon is being removed and handled preparatory to discharging the cone or plug into the holder, as a cone. This difference in surface, making one comparatively rough, is merely a matter of different plating or of buffing or polishing before plating, the outer surface being as smooth as possible to facilitate the cutting out of the cone or plug.

With this spoon, an approximate measured amount of ice cream can be dished in the form of a plug or cone without packing or compressing the ice cream, as in ice cream dishers which include bowls, into which the cream is scooped. Also, owing to the offset handle the spoon can be manipulated to better advantage and guided more accurately with less effort and skill than a spoon or spade with the shank attached to the blade at the center thereof or between the side edges.

What I claim is:

An ice cream disher comprising a spoon and a handle having a shank portion adjacent the spoon and extending substantially tangent to one side margin of the spoon, whereby the spoon is located entirely at one side of the shank, the spoon being pointed at its advance end and arranged with its lengthwise dimension extending in a general direction lengthwise of the shank and the side edges of the spoon tapering from the rear end of the spoon toward the point, the spoon being arcuate in cross section and in lengthwise section with its rear end open and extending from the end of its arcuate formation adjacent the shank below the horizontal plane of the shank and the general horizontal plane of the side edges of the spoon, when the disher is held in horizontal position, the point of the spoon being located near said horizontal plane and the wall of the spoon tapering from its open rear end toward the point.

HAROLD P. GRAY.